United States Patent Office 2,700,677
Patented Jan. 25, 1955

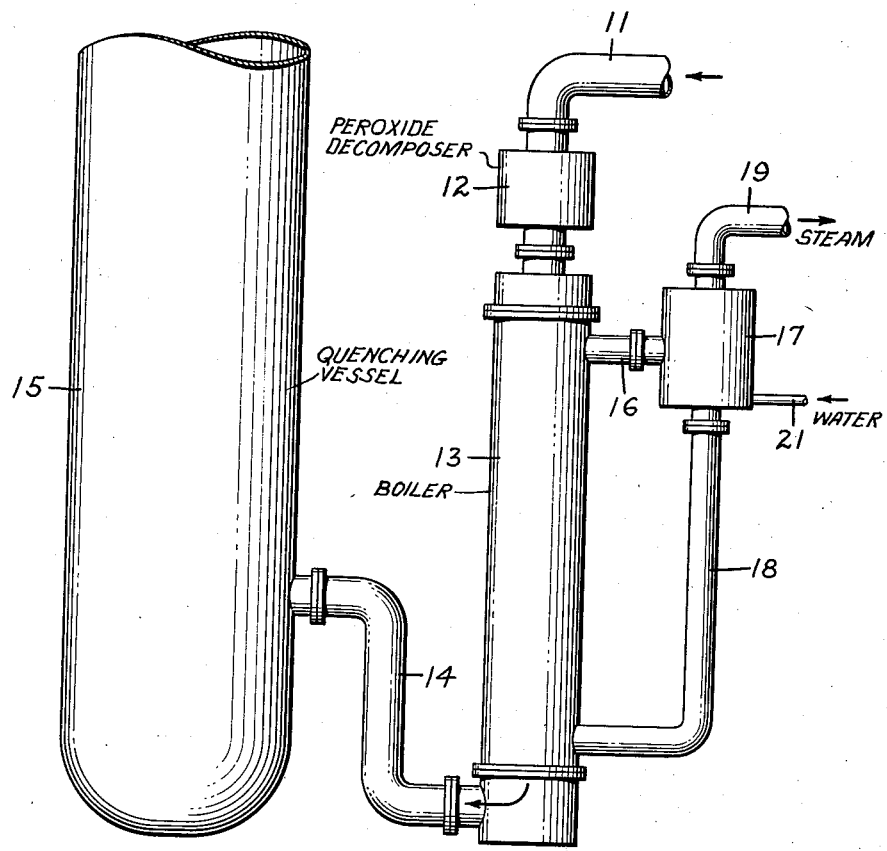

2,700,677

OXIDATION OF HYDROCARBONS

Kenneth D. Bowen, Corpus Christi, David R. Keck, Kingsville, and David C. Lee, Jr., Bishop, Tex., assignors to Celanese Corporation of America, New York, N. Y., a corporation of Delaware Application June 10, 1952, Serial No. 292,764

3 Claims. (Cl. 260—452)

This invention relates to a process for the oxidation of hydrocarbons, and relates more particularly to an improved process for the partial oxidation of hydrocarbons wherein a large portion of the heat generated during such partial oxidation is recovered in useful form.

The vapor phase partial oxidation of hydrocarbons, such as propane, butane or mixtures thereof, with an oxygen-containing gas, such as air, is normally carried out by bringing together the hydrocarbon and air at an elevated temperature. An exothermic reaction takes place between the hydrocarbon and the oxygen in the air producing a large number of oxygenated organic compounds and causing a considerable rise in the temperature of the reaction mixture. The oxygenated organic compounds produced by this reaction include, for example, formaldehyde, acetaldehyde, formic acid, methanol, acetone, methylal and other acetals, methyl ethyl ketone, alkylene oxides and peroxides. There are also produced small quantities of resin-forming substances. To prevent any further reactions from taking place between the products listed above to form materials of lower economic value or additional resin-forming substances, or to minimize the extent of any such reactions, and to prevent the deposition in the equipment of the resin-forming substances, it has been considered desirable to cool the reaction gases to a relatively low temperature rapidly by quenching the said reaction gases with a liquid medium. The quenching of the reaction gases involves a complete loss of the thermal energy contained in the reaction gases. It also requires a considerable cooling capacity to maintain the temperature of the quenching medium at a desirably low value.

It is an important object of the invention to provide a highly economical process for the partial oxidation of hydrocarbons which will be free from the foregoing and other difficulties.

A further object of this invention is to provide a process for the partial oxidation of hydrocarbons wherein a large portion of the heat generated during such partial oxidation is recovered in useful form.

Other objects of this invention will be apparent from the following detailed description and claims.

According to the present invention, the hot reaction gases produced by the partial oxidation of hydrocarbons with an oxygen-containing gas, and which are at a temperature of between about 800 and 900° F., are treated so as to decompose the peroxides contained therein. The hot reaction gases are then cooled to a temperature of not less than about 300° F., or preferably not less than about 500° F. in any desired manner and the heat given up during said cooling is recovered in useful form, for example, as steam. The partially cooled gases are then quenched with a liquid medium to lower their temperature rapidly so as to prevent or to minimize any further reactions between the oxygenated hydrocarbons contained therein, and to prevent the deposition of any resin-forming substances.

Decomposition of the peroxides is effected by bringing the hot reaction gases containing the peroxides into contact with a peroxide decomposing catalyst. For example, the hot reaction gases may be passed over carbon steel rings, carbon coated rings, carbon coated packing materials of all types, soda glass tubes, aluminum, activated charcoal, tungstic oxide or alumina. Carbon steel rings are highly desirable for this service as they possess ample physical strength, are readily available and retain their peroxide decomposing activity for extended periods of time. The carbon steel rings are conveniently employed by packing a suitable tube or vessel with said rings and passing the hot reaction gases through the tube or vessel so that said reaction gases come into contact with the surfaces of said rings. The peroxides contained in the hot reaction gases are readily decomposed by this treatment. Usually, a contact time of between about 0.1 to 0.2 of a second is sufficient to decompose all the peroxides. The decomposition of the peroxides tends to stabilize the hot reaction gases in that the peroxides seem to catalyze reactions between the oxygenated products in said gases with the formation of materials having a lower economic value or capable of forming resins during subsequent processing steps.

Following the decomposition of the peroxides, the hot reaction gases are cooled to a temperature of not less than about 300° F., or preferably not less than about 500° F., and the heat given up during said cooling is recovered in useful form. The cooling is advantageously effected by transferring the heat contained in said gases to a solid. A particularly desirable manner of effecting the cooling of the hot reaction gases is to pass the said gases through a steam boiler which may, for example, be a water-tube or a fire-tube boiler so that the heat given up by the hot reaction gases will be converted to steam at pressures ranging up to about 650 pounds per square inch or higher. The cooling should be effected in an interval of not more than about 0.7 seconds, or preferably between about 0.5 and 0.3 seconds. Because the peroxides normally present in the hot reaction gases have been decomposed before the cooling step there is little or no tendency for further reactions to take place between the oxygenated products during the cooling step. However, if the cooling is carried out so as to reduce the temperature of the hot reaction gases below the value specified above, or if the cooling is carried out in an interval of time longer than that specified above, reactions will take place to a considerable extent between the oxygenated products. This will lower the economic value of the products produced by the partial oxidation. It will also result in the deposition of resins on the surfaces of the boiler and other lines and vessels through which the partially cooled reaction gases flow, reducing the efficiency of heat transfer from the gases and possibly even plugging the said vessels and lines.

The partially cooled reaction gases are then quenched by direct contact with a liquid medium to lower their temperature rapidly so as to prevent any reaction between the oxygenated products or the deposition of resins. Advantageously, the quenching is effected by bringing the partially cooled reaction gases into contact with an aqueous medium which not only cools the reaction gases but also dissolves all or a portion of the oxygenated products so as to remove said products from said gases. The oxygenated products may be recovered from said aqueous medium by distillation, extraction and the like in a manner well known in the art.

The process of the present invention permits a large portion of the heat generated during the partial oxidation to be recovered in useful form. It also reduces the cooling capacity required to maintain the temperature of the quenching medium at a desirably low value. In addition, it has been found that the aqueous solution obtained with the process has a better color and odor and a lesser tendency to form resins when it is heated for distillation, or the like, during the separation of the oxygenated products therefrom as compared with the aqueous solution obtained when the hot reaction gases are quenched directly with said medium.

A preferred embodiment of the apparatus of this invention is shown diagrammatically in the accompanying drawing.

Referring now to the drawing, the reference numeral 11 designates a conduit through which hot reaction gases from the partial oxidation of hydrocarbons flow into a vessel 12 which is filled with carbon steel rings to decompose catalytically the peroxides in said gases. From the vessel 12, the hot reaction gases flow through the tubes of a fire-tube boiler 13 wherein the gases are partially cooled. The partially cooled gases then flow through a conduit 14 to a vessel 15 wherein they are quenched by direct contact with an aqueous medium. Steam generated in the boiler 13 flows through a conduit 16 to an entrainment separator 17 where any water particles are separated out and returned to the boiler 13 through a conduit 18 while the dry steam flows out through a conduit 19. Water is introduced into the system through a feed line 21. If desired, the vessel 12 and the boiler 13 may be combined in a single shell. The entrainment separator 17 may be eliminated in certain cases, in which event the feed line may be connected directly to the boiler 13.

It is to be understood that the foregoing detailed description is given merely by way of illustration and that many variations may be made therein without departing from the spirit of our invention.

Having described our invention, what we desire to secure by Letters Patent is:

1. In a process for the production of oxygenated organic compounds by the vapor phase partial oxidation of hydrocarbons selected from the group consisting of propane and butane with an oxygen containing gas, the steps which comprise decomposing the peroxides in the hot reaction gases produced during the partial oxidation, cooling the hot reaction gases which are at a temperature of between about 800 and 900° F. to a temperature of about 500° F. by heat transfer to a solid in an interval of not more than about 0.7 seconds while recovering the heat from said gases in useful form, and quenching the partially cooled reaction gases by direct contact with a liquid medium.

2. In a process for the production of oxygenated organic compounds by the vapor phase partial oxidation of hydrocarbons selected from the group consisting of propane and butane with an oxygen containing gas, the steps which comprise decomposing the peroxides in the hot reaction gases produced during the partial oxidation, cooling the hot reaction gases which are at a temperature of between about 800 and 900° F. to a temperature of about 500° F. in an interval of not more than about 0.7 seconds by passing the same through a steam boiler, and quenching the partially cooled reaction gases by direct contact with an aqueous medium.

3. In a process for the production of oxygenated organic compounds by the vapor phase partial oxidation of hydrocarbons selected from the group consisting of propane and butane with an oxygen containing gas, the steps which comprise decomposing the peroxides in the hot reaction gases produced during the partial oxidation, cooling the hot reaction gases which are at a temperature of between about 800 and 900° F. to a temperature of about 500° F. in an interval of about 0.5 to 0.3 seconds while recovering the heat from said gases in useful form, and quenching the partially cooled reaction gases by direct contact with an aqueous liquid medium.

References Cited in the file of this patent

UNITED STATES PATENTS

| | | |
|---|---|---|
| 2,376,668 | Derby | May 22, 1945 |
| 2,398,612 | Bergsteinsson et al. | Apr. 16, 1946 |
| 2,482,284 | Michael et al. | Sept. 20, 1949 |
| 2,570,216 | Dice et al. | Oct. 16, 1951 |